July 15, 1952  D. LIPPEY  2,603,348

MULTIPLE SPOOL FISHING LINE PACKAGE

Filed April 24, 1950

INVENTOR.
David Lippey.
BY Albert J. Fihe
ATTORNEY.

Patented July 15, 1952

2,603,348

UNITED STATES PATENT OFFICE 2,603,348

MULTIPLE SPOOL FISHING LINE PACKAGE

David Lippey, Glendale, Calif.

Application April 24, 1950, Serial No. 157,659

2 Claims. (Cl. 206—56)

This invention relates to an improved means and method for packaging fishing line on connected spools and has for one of its principal objects the elimination of the knot which has heretofore been considered necessary upon each individual spool of such fishing line so as to prevent the line from unwinding on a spool when one spool is separated from another by cutting the line.

One of the important objects of this invention is to produce a construction whereby a number of spools for holding fishing line or the like can be preliminarily joined and whereby a considerable length of line or cord can be wound on the spools in succession by simply shifting the winding apparatus from one spool to another when a spool has been filled and without the necessity of stopping to place a knot in the cord to insure a unitary spool of line when the spool is separated from an adjacent spool or spools.

This particular object of the invention is accomplished by the employment of a plastic strip or other tape-like material applied to the arbors of two adjacent spools and in such a manner that when the spools are filled with line, the line will cover that portion of the plastic strip or tape which is attached to the arbor. This enables a ready separation of the spools by simply cutting the line between the adjacent spools and either breaking or cutting the plastic strip.

A further object of this invention is to provide an additional means for retaining the free end of the line on each separated spool in position after the line has been cut whereby unraveling or unwinding of the line is prevented.

Other and further important objects of the invention will be apparent from the disclosures in the accompanying drawings and following specification.

The invention, in a preferred form, is illustrated in the drawings and hereinafter more fully described.

Figures 1, 2:
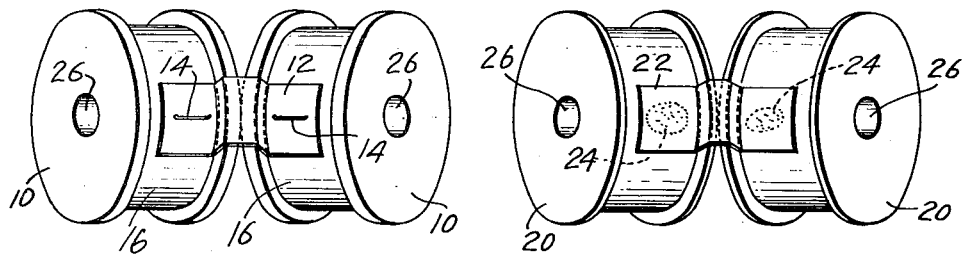
Figure 1 is a perspective view showing two spools upon which fishing line is ordinarily wound and illustrating the attaching means of this invention applied thereto.
Figure 2 is a view similar to Figure 1 but showing a slight modification of the invention.

The reference numerals 10 indicate generally two ordinary spools upon which fishing line is adapted to be wound in various and varied lengths and of various widths and sizes. These spools are also of various shapes, sizes and material but a representative spool made of paper or some similar material is illustrated in this figure.

In accordance with the principles of this invention, a plastic strip 12 or tape of comparatively large width is fastened to each of the spools by means of staples or the like 14. These staples are driven into the arbors 16 of the spools in such a fashion that they will not be likely to become loose and the plastic strip overlaps the juxtaposed flanges of the spools as indicated. Obviously, the strip or tape 12 need not be of any particular plastic or even of any particular material but is mainly for the purpose of preliminarily joining two or more adjacent spools for a line winding operation and for ready and convenient separation of the filled spools if, as and when such separation becomes desirable or necessary.

In Figure 2 the spools 20 are composed of some plastic material and a plastic strip 22 is joined to two adjacent spools much as in the same manner as illustrated in Figure 1 but the juncture is formed by some plastic solvent adhesive as shown at 24. In this case, both the spools and the strip must be of plastic or at least plastic impregnated so that suitable adhesion between the strip and the arbors of the spools will be accomplished.

It will be noted that each and every one of the spools has a central opening 26 longitudinally therethrough which is primarily for the purpose of supporting the spools upon a spindle or shaft 28 which forms part of the actual winding machine or apparatus.

Figure 3:
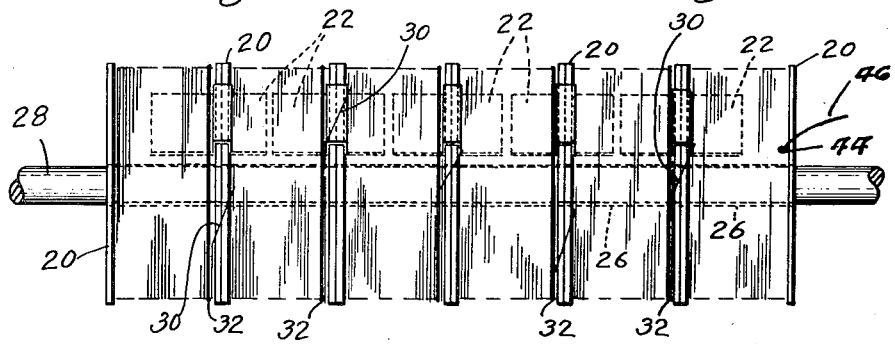
Figure 3 illustrates in more detail the method of winding a number of associated spools with a single length of line upon a spindle and without the necessity of knotting the line in every case after each individual spool has been filled.

In Figure 3 such a supporting spindle or shaft 28 is illustrated and is shown as having six spools 20 mounted thereon and preliminarily joined to each other by means of plastic or other strips 22. The strips are shown as separated but a single unitary length can be employed if found feasible and the number of spools may be varied within limits, depending mainly upon the length of line which is to be wound upon a number of spools.

A representative setup comprises six spools, each having fifty yards of line wound thereon, thereby producing a total length of line amounting to three hundred yards. In some cases, it is desirable for a fisherman to have at least three hundred yards of line available upon his reel and this makes the same possible by means of a simple unwinding operation from the six spools and with no necessity of undoing individual knots at the end of the wind upon each individual spool, which knots have heretofore been considered as indispensable. These knots were usually drawn rather tightly at the factory and considerable skill was necessary in untying the same without breaking a few individual strands or threads of the braided or twisted line, which, of course, would weaken the line at these points.

In the operation of this invention, the line is started upon an end spool, for example, the one at the left hand side of Figure 3, and will preliminarily fill that spool to the desired yardage, say fifty yards, and the entire set of spools is then automatically shifted to the left or the line feed shifted to the right, thereby allowing the line to jump over the adjoining flanges of the two left hand adjacent spools as shown at 30 in the figure.

When the line is wound on the spools, it presses the plastic strips 22 into closer relationship with the arbor and flange of each spool, the plastic being sufficiently resilient to allow this action without danger of breakage. In this manner, the spool can be adequately filled with line and no undesirable humping results. The process is continued until all the spools are filled to the desired capacity, whereupon the set is removed from the spindle 28, with a desired continuous length of line intact upon the particular number of associated spools.

For further insurance against undesirable unwinding of the line in the event that the spools are separated by cutting the line and the strips 22, a rubber or other elastic band 32 is fitted into position at the right hand edge of each spool and over the line just at the point where it shifts to the adjacent spool. This will assure that the line will stay fixed in position on that particular spool even though the spools and lines are separated into individual units and lesser lengths.

Figure 4:
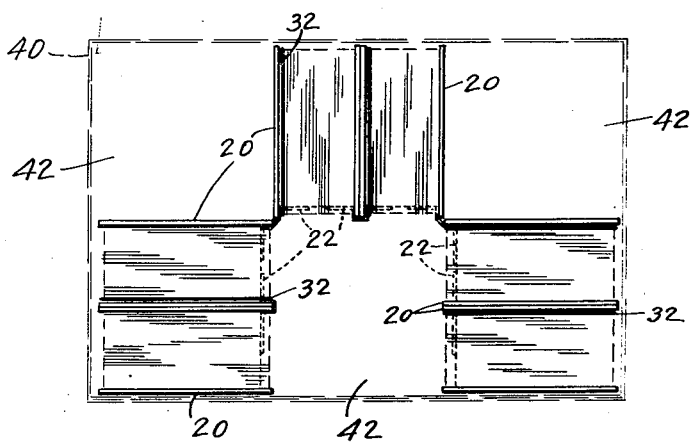
Figure 4 illustrates a preferred method of packaging six spools of joined line in a single unit and in one container.

This particular method of winding lends itself admirably to packaging as is illustrated in Figure 4. In this figure, the six spools 20 are shown packed in a box or carton 40 and grouped in pairs with fillers 42 spaced about the box as shown. Obviously, other means of packaging may be employed. For example, the six spools may be simply kept in alignment as they come off the winding shaft as shown in Figure 3 and placed in a box of corresponding dimensions.

The plastic or other strips 12 and 22 are of such dimensions and material that attached spools can be readily broken or cut apart but without any danger of accidental breakage or separation due to twisting. The width of the strip is important in this regard and a suitable type of plastic having the necessary strength and resiliency is preferred.

As best illustrated in Figure 3, the line is knotted into position after the last spool has been filled, the knot being indicated by the reference numeral 44, and the line is then cut leaving a short end 46 which permits of grasping for untying the knot.

It will be evident that herein is provided a novel, efficient and very satisfactory manner of joining spools of line, thread, cord, string or the like into a plurality of interconnected units, each of which will in itself form an individual marketable structure, and any number of which will likewise form a unit of a desired length of the line or cord.

The strips or tapes 12 and 22 are sufficiently strong to positively eliminate any danger of accidental breakage and unraveling of the line but, at the same time, they are sufficiently resilient and of a suitable thickness so as to allow a certain amount of manipulation between the individual spools. The fact that the strips are quite thin and also somewhat resilient enables a satisfactory winding operation upon each spool with no visible distortion of the generally cylindrical appearance of the edge where the line covers the attaching strips.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

1. A package of fishing line comprising a plurality of similar spools arranged in juxtaposed relationship, a flexible strip positioned across the flanges of adjacent spools and fastened to the hubs thereof, a quantity of line wound on the hubs of the juxtaposed spools and over that portion of the flexible strip which is on the hub, the line also extending continuously across the flanges of adjacent spools whereby the spools can be arranged in lineal or parallel relationship.

2. A package of fishing line as defined in claim 1, wherein that portion of the flexible strip joining adjacent spools and extending over the flanges thereof is not covered by the line and can be readily severed for separating the spools and contained line.

DAVID LIPPEY.

REFERENCES CITED

The following references are of record in the file of this patent:

UNITED STATES PATENTS

| Number | Name | Date |
|---|---|---|
| 1,468,994 | Cook | Sept. 25, 1923 |
| 1,710,393 | Williams | Apr. 23, 1929 |
| 1,797,539 | Arthur | Mar. 24, 1939 |
| 2,561,699 | Hoyle | June 24, 1948 |